(12) United States Patent
Inagawa

(10) Patent No.: US 9,124,416 B2
(45) Date of Patent: Sep. 1, 2015

(54) METHOD FOR DETERMINING PHASE OF CLOCK USED FOR RECEPTION OF PARALLEL DATA, RECEIVING CIRCUIT, AND ELECTRONIC APPARATUS

(71) Applicant: FUJITSU SEMICONDUCTOR LIMITED, Yokohama-shi, Kanagawa (JP)

(72) Inventor: Ryoichi Inagawa, Akiruno (JP)

(73) Assignee: SOCIONEXT INC., Yokohama (JP)

( * ) Notice: Subject to any disclaimer, the term of this patent is extended or adjusted under 35 U.S.C. 154(b) by 0 days.

(21) Appl. No.: 14/458,780

(22) Filed: Aug. 13, 2014

(65) Prior Publication Data

US 2015/0071396 A1   Mar. 12, 2015

(30) Foreign Application Priority Data

Sep. 11, 2013   (JP) .................................. 2013-188496

(51) Int. Cl.
  *H03D 3/24*   (2006.01)
  *H04L 7/033*   (2006.01)

(52) U.S. Cl.
  CPC .................................... *H04L 7/0337* (2013.01)

(58) Field of Classification Search
  CPC .................................................. H04L 7/0337
  USPC ........................................................ 375/376
  See application file for complete search history.

(56) References Cited

U.S. PATENT DOCUMENTS

| 4,600,895 | A * | 7/1986 | Landsman ..................... 331/1 A |
| 4,700,347 | A * | 10/1987 | Rettberg et al. ............... 714/700 |
| 5,488,641 | A * | 1/1996 | Ozkan ........................... 375/374 |
| 6,259,290 | B1 * | 7/2001 | Takada et al. ................. 327/158 |
| 6,456,129 | B1 * | 9/2002 | Tsukude ........................ 327/156 |
| 7,173,462 | B1 * | 2/2007 | Wang ............................ 327/158 |
| 7,269,240 | B2 * | 9/2007 | Hsu et al. ...................... 375/376 |
| 7,421,054 | B2 * | 9/2008 | Sumiyoshi .................... 375/376 |
| 8,310,384 | B2 * | 11/2012 | Yeh et al. ....................... 341/111 |
| 2001/0007136 | A1 * | 7/2001 | Tamura et al. ................ 713/500 |

FOREIGN PATENT DOCUMENTS

| JP | 6-224962 A | 8/2003 |
| JP | 2003-224551 A | 8/2003 |
| JP | 2006-50102 A | 2/2006 |
| JP | 2008-235985 A | 10/2008 |

* cited by examiner

*Primary Examiner* — Juan A Torres
(74) *Attorney, Agent, or Firm* — Arent Fox LLP

(57) ABSTRACT

For each of a plurality of delayed phases, one of the plurality of delayed phases being the same as a phase of a reference clock and the others of the plurality of delayed phases delayed with respect to the phase of the reference clock, test parallel data transmitted in synchronism with the reference clock is received in synchronism with a delayed clock having the delayed phase and an adjacent delayed clock having a delayed phase adjacent to the delayed phase of the delayed clock, respectively; and a phase range containing a delayed phase with which the test parallel data has been received correctly and for which the result of the comparison indicates a match is determined from among the plurality of delayed phases; and the phase of a receive clock to be used for reception of parallel data is determined from the determined phase range.

14 Claims, 12 Drawing Sheets

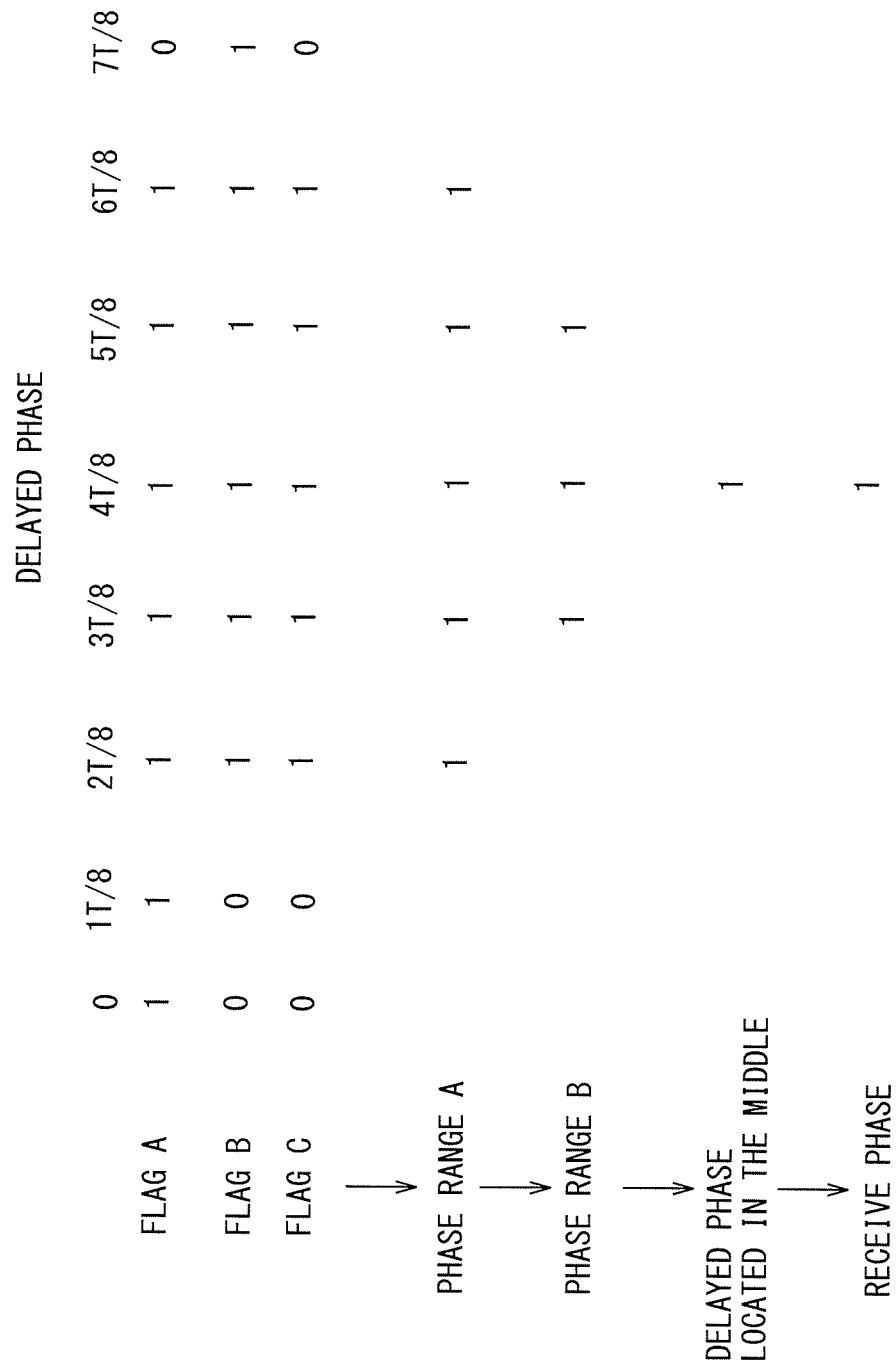

METHOD FOR DETERMINING PHASE OF CLOCK USED FOR RECEPTION OF PARALLEL DATA, RECEIVING CIRCUIT, AND ELECTRONIC APPARATUS

CROSS-REFERENCE TO RELATED APPLICATIONS

This application is based upon and claims the benefit of priority of the prior Japanese Patent Application No. 2013-188496, filed on Sep. 11, 2013, the entire contents of which are incorporated herein by reference.

FIELD

The present invention relates to a method for determining the phase of a clock used for reception of parallel data, and also relates to a receiving circuit and an electronic apparatus.

BACKGROUND

Receiving circuits for receiving parallel data are known in the art.

In the case of parallel data, a difference (skew) can occur in the arrival times of data at the receiving circuit due to such factors as variations in the characteristics of the signal lines used to carry the data or the circuit elements constituting the transmitting circuit used to transmit the data.

When receiving such parallel data, it is preferable to use a clock that provides timing with which all of the data can be received in synchronized fashion.

Therefore, the receiving circuit for receiving the parallel data adjusts the phase of the clock so as to be able to receive the data in synchronized fashion, and receives the parallel data by using the thus adjusted clock.

FIG. 1 is a diagram illustrating a digital camera incorporating a prior art receiving circuit.

The digital camera 101 includes a memory card 120 which stores image data and a receiving circuit 110 which receives parallel data output from the memory card 120. The digital camera 101 also includes a main control unit 102 which controls the receiving circuit 110 and a main storage unit 103 which stores the parallel data received by the receiving circuit 110. The digital camera 101 further includes an imaging unit not depicted and a transmitting circuit which transmits captured image data to the memory card 120.

The receiving circuit 110, under control of the main control unit 102, receives the image data output from the memory card 120 and supplies the received image data to the main storage unit 103.

As depicted in FIG. 2, the memory card 120 simultaneously outputs 8-bit parallel data for transmission to the receiving circuit 110 via eight data lines D0 to D7 in synchronism with a reference clock supplied from the receiving circuit 110.

When the data transmitted via the data lines D0 to D7 are received at the receiving circuit 110, skew is present between the data N−1, N transmitted via the data line D0 and the data N−1, N transmitted via the data line D7.

Then, in order to receive the transmitted parallel data in synchronized fashion, the receiving circuit 110, using test parallel data, determines a receive clock that provides timing with which the data can be received, and starts to receive the image data by using the thus determined receive clock. The receive clock is determined so that the timing falls within a receivable period during which all of the data can be received in synchronized fashion. After determining the receive clock by using the test parallel data, the receiving circuit 110 starts to receive the image data.

Next, a description will be given of how the receiving circuit 110 determines the receive clock.

The receiving circuit 110 includes a PLL 111 as a phase-locked loop circuit which generates the reference clock. The PLL 111 supplies the generated reference clock to a DLL 112 as well as to the memory card 120.

The DLL 112 is a delay-locked loop circuit which takes as an input the reference clock generated by the PLL 111 and outputs delayed clocks delayed in phase with respect to the reference clock. As illustrated in FIG. 3, the DLL 112 generates delayed clocks, one having the same phase as the reference clock (delayed phase 0) and the others having delayed phases respectively delayed by 1T/8 to 7T/8 with respect to the phase of the reference clock, where T is one clock period of the reference clock. The eight delayed clocks are shifted in phase by T/8 relative to each other.

The DLL 112 supplies the generated delayed clocks to a storage unit 113. The storage unit 113 includes eight flip-flops (FF0 to FF7). Each of the flip-flops FF0 to FF7 is connected to a corresponding one of the eight data lines D0 to D7 and, in synchronism with the delayed clock supplied from the DLL 112, receives and holds one-bit data out of the 8-bit parallel data transmitted from the memory card 120.

A DLL control unit 117, under control of the main control unit 102, controls the delayed phase of the delayed clock that the DLL 112 generates. The DLL 112 generates the delayed clock having the delayed phase specified by the DLL control unit 117.

Further, the DLL control unit 117 directs the memory card 120 to transmit test parallel data and image data. Data having a cyclic redundancy check code, for example, can be used as the test parallel data.

When an instruction requesting transmission of test parallel data is received from the DLL control unit 117, the memory card 120 transmits the test parallel data to the receiving circuit 110 via the eight data lines in synchronism with the reference clock.

The receiving circuit 110 receives the test parallel data by using each of the eight delayed clocks having different delayed phases, and determines a phase range containing any delayed phase with which the test parallel data can be received correctly. Then, from the thus determined phase range, the receiving circuit 110 determines the phase of the receive clock to be used for reception of the parallel data.

First, the DLL control unit 117 instructs the DLL 112 to generate the delayed clock whose delayed phase is the same as the phase of the reference clock, and also instructs the memory card 120 to transmit out the test parallel data.

The storage unit 113 receives and holds the test parallel data in synchronism with the delayed clock supplied from the DLL 112. More specifically, each of the flip-flops FF0 to FF7 in the storage unit 113 receives and holds one-bit data in synchronism with the delayed clock, and outputs the thus held data to a judging unit 115.

The judging unit 115 that received the test parallel data from the storage unit 113 checks the data by using a cyclic redundancy check code, judges whether the data has been received correctly or not, and supplies the result of the judgment to the DLL control unit 117.

The DLL control unit 117 that received the result of the judgment then instructs the DLL 112 to generate a delayed clock having a delayed phase delayed by 1T/8 with respect to the phase of the reference clock, and also instructs the memory card 120 to transmit out the test parallel data.

By repeating the above process, the receiving circuit 110 determines the phase range containing any delayed phase with which the test parallel data can be received correctly.

PRIOR ART DOCUMENTS

Patent Documents

Japanese Laid-open Patent Publication No. H06-224962
Japanese Laid-open Patent Publication No. 2006-50102
Japanese Laid-open Patent Publication No. 2003-224551
Japanese Laid-open Patent Publication No. 2008-235985

SUMMARY

According to an aspect of the embodiment disclosed in this specification, a method for determining the phase of a clock to be used for reception of parallel data is provided, the method comprising: for each of a plurality of delayed phases, one of the plurality of delayed phases being the same as a phase of a reference clock and the others of the plurality of delayed phases being delayed with respect to the phase of the reference clock, transmitting test parallel data in synchronism with the reference clock, and receiving the test parallel data in synchronism with a delayed clock having the delayed phase and an adjacent delayed clock having a delayed phase adjacent to the delayed phase of the delayed clock, respectively; for each of the plurality of delayed phases, judging whether the parallel data received by the delayed clock has been received correctly or not, and performing a comparison as to whether the parallel data received by the delayed clock matches the parallel data received by the adjacent delayed clock; determining a phase range containing, from among the plurality of delayed phases, a delayed phase with which the test parallel data has been received correctly and for which a result of the comparison indicates a match; and determining, from the determined phase range, a phase of a receive clock to be used for reception of parallel data.

According to an aspect of the embodiment disclosed in this specification, a receiving circuit is provided comprising: a delay-locked loop circuit configured to output, for each of a plurality of delayed phases, one of the plurality of delayed phases being the same as a phase of a reference clock and the others of the plurality of delayed phases being delayed with respect to the phase of the reference clock, a delayed clock having the delayed phase and an adjacent delayed clock having a delayed phase adjacent to the delayed phase of the delayed clock, respectively; a first storage circuit configured to receive and store, in synchronism with the delayed clock output from the delay-locked loop circuit, test parallel data that has been transmitted in synchronism with the reference clock; a second storage circuit configured to receive and store, in synchronism with the adjacent delayed clock output from the delay-locked loop circuit, the parallel data that has been transmitted in synchronism with the reference clock; a judging circuit configured to judge, for each of the plurality of delayed phases, whether the parallel data stored in the first storage unit has been received correctly or not, and to output a result of the judgment; a comparison circuit configured to perform, for each of the plurality of delayed phases, a comparison as to whether the parallel data received in synchronism with the delayed clock and stored in the first storage unit matches the parallel data received in synchronism with the adjacent delayed clock and stored in the second storage unit, and to output a result of the comparison; and a phase determining circuit configured to receive the result of the judgment and the result of the comparison, to determine a phase range containing, from among the plurality of delayed phases, a delayed phase with which the test parallel data has been received correctly and for which the result of the comparison indicates a match, and to determine, from the determined phase range, a phase of a receive clock to be used for reception of parallel data.

According to an aspect of the embodiment disclosed in this specification, an electronic apparatus incorporating a receiving circuit is provided, the receiving circuit comprising: a delay-locked loop circuit configured to output, for each of a plurality of delayed phases, one of the plurality of delayed phases being the same as a phase of a reference clock and the others of the plurality of delayed phases being delayed with respect to the phase of the reference clock, a delayed clock having the delayed phase and an adjacent delayed clock having a delayed phase adjacent to the delayed phase of the delayed clock, respectively; a first storage circuit configured to receive and store, in synchronism with the delayed clock output from the delay-locked loop circuit, test parallel data that has been transmitted in synchronism with the reference clock; a second storage circuit configured to receive and store, in synchronism with the adjacent delayed clock output from the delay-locked loop circuit, the parallel data that has been transmitted in synchronism with the reference clock; a judging circuit configured to judge, for each of the plurality of delayed phases, whether the parallel data stored in the first storage unit has been received correctly or not, and to output a result of the judgment; a comparison circuit configured to perform, for each of the plurality of delayed phases, a comparison as to whether the parallel data received in synchronism with the delayed clock and stored in the first storage unit matches the parallel data received in synchronism with the adjacent delayed clock and stored in the second storage unit, and to output a result of the comparison; and a phase determining circuit configured to receive the result of the judgment and the result of the comparison, to determine a phase range containing, from among the plurality of delayed phases, a delayed phase with which the test parallel data has been received correctly and for which the result of the comparison indicates a match, and to determine, from the determined phase range, a phase of a receive clock to be used for reception of parallel data.

The object and advantages of the embodiments will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a diagram (part 3) illustrating how phase range and receive phase are determined.

DESCRIPTION OF EMBODIMENTS

Figure 1:
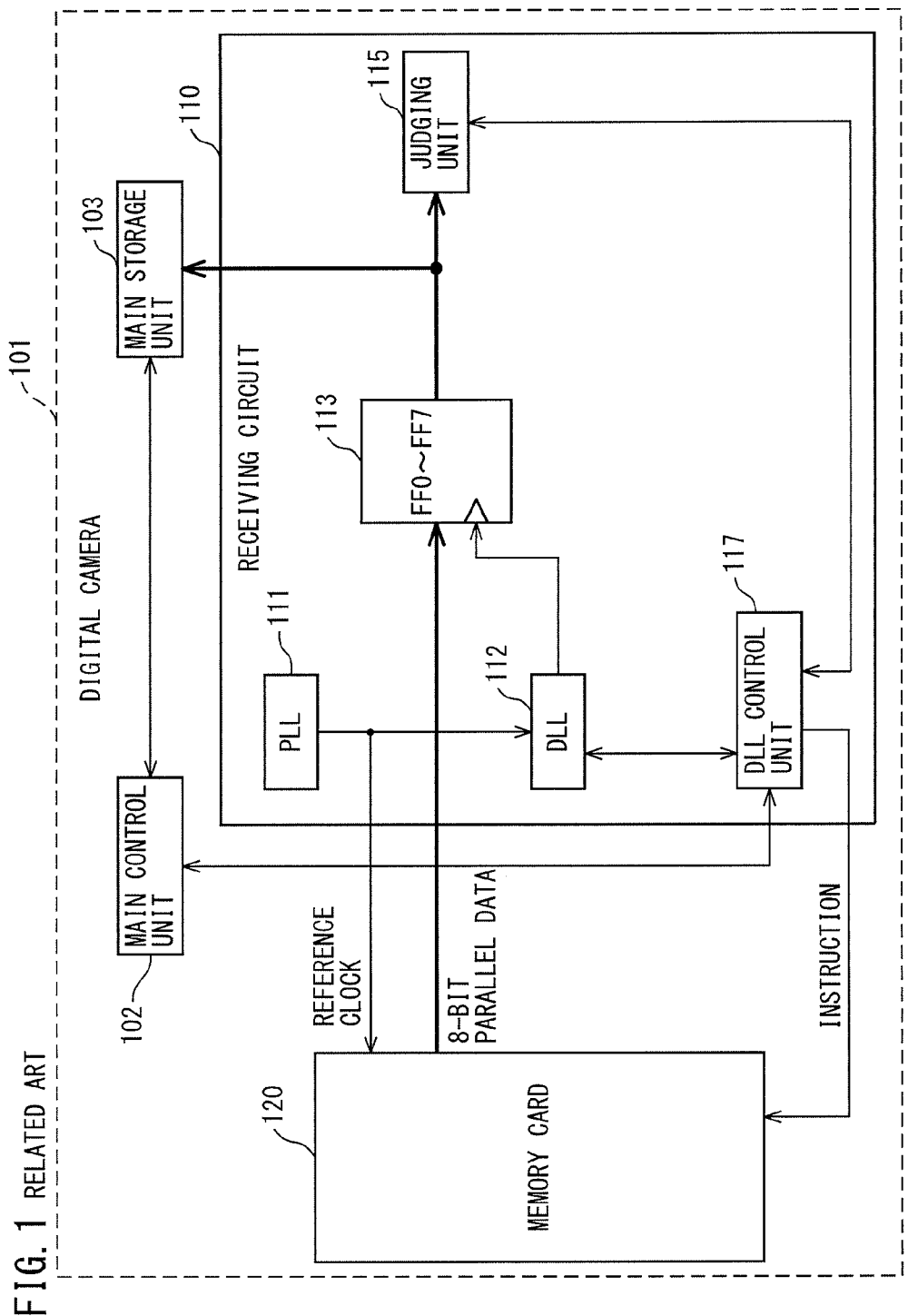
FIG. 1 is a diagram illustrating a digital camera according to the prior art.
Figure 2:
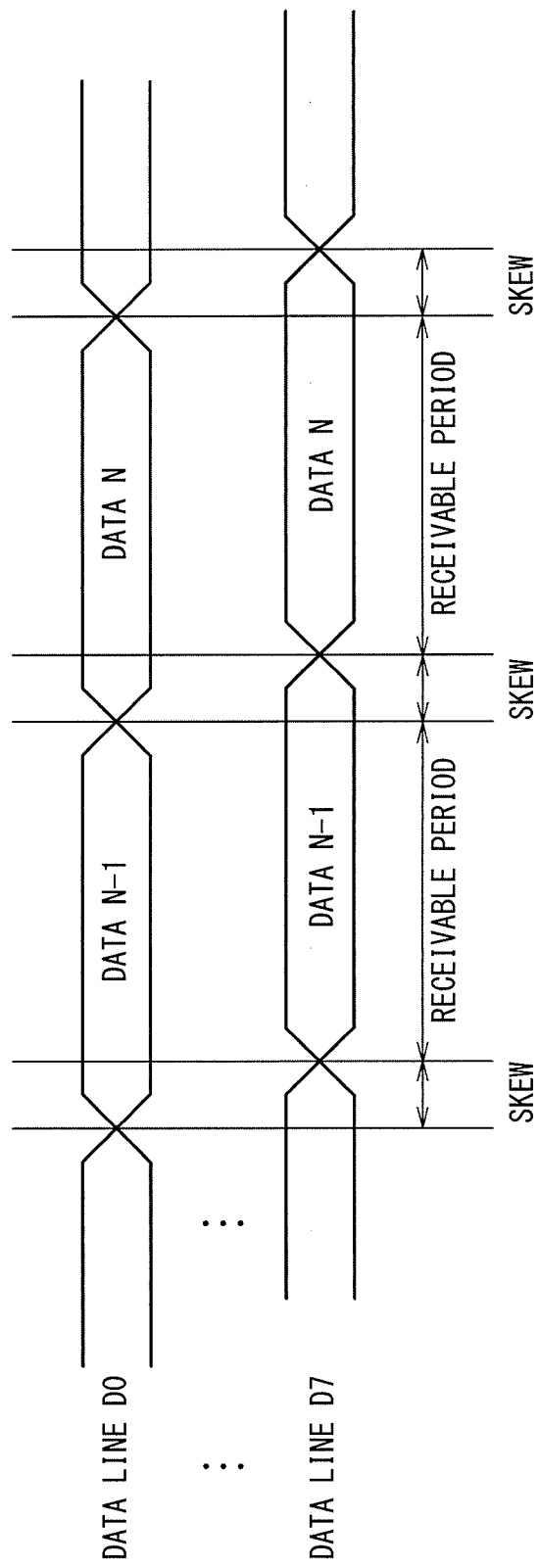
FIG. 2 is a diagram illustrating parallel data in which skew is present.
Figure 3:
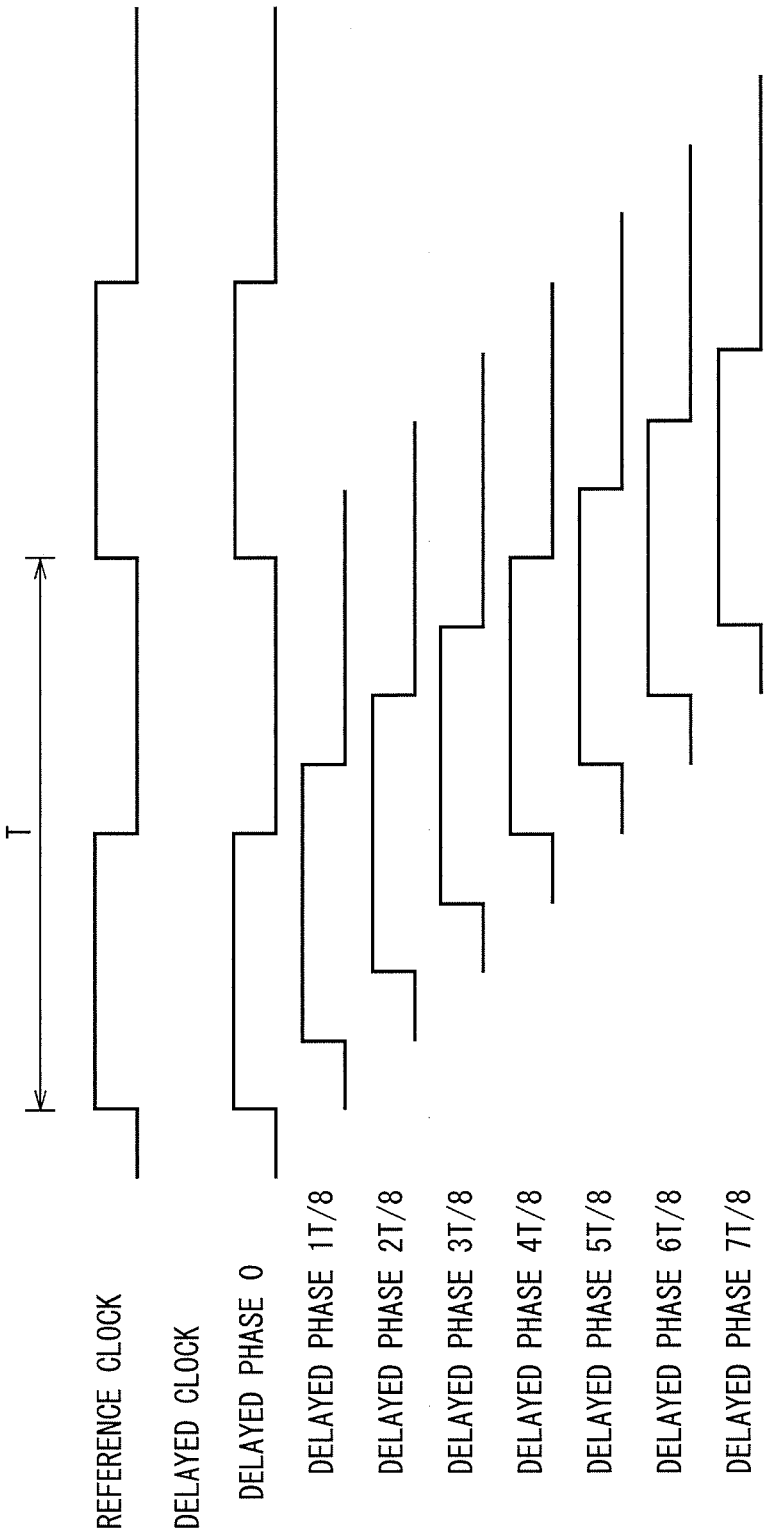
FIG. 3 is a diagram illustrating delayed clocks that a DLL outputs.

In FIGS. 1 to 3, suppose that as a result of receiving the test parallel data by using each of the eight delayed clocks having different delayed phases, it is determined that the test parallel data has been received correctly with any one of the delayed clocks having the different delayed phases (0 to 7T/8).

Figure 4:
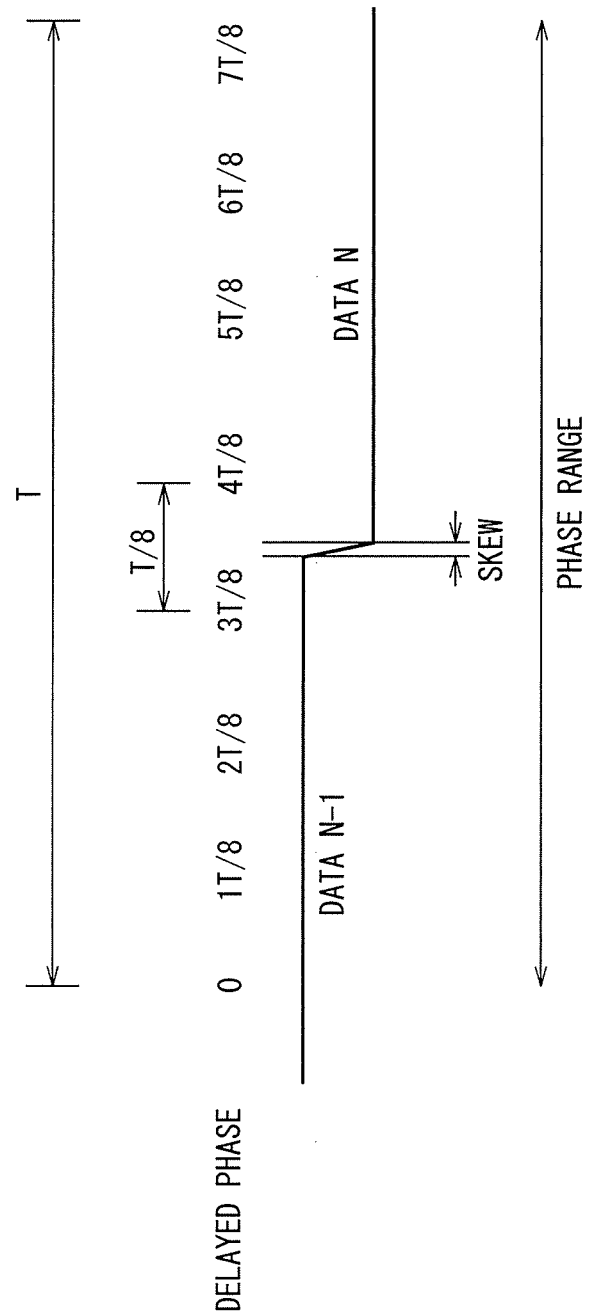
FIG. 4 is a diagram illustrating a phase range determined by a prior art receiving circuit.

In this case, the phase range containing any delayed phase with which the test parallel data can be received correctly contains all of the eight delayed phases (0 to 7T/8), as depicted in FIG. 4. Usually, from the standpoint of ensuring stable reception, it is preferable to select the phase having a value located at the midpoint of the phase range as the phase of the receive clock to be used for reception of the parallel data. In the illustrated case, the delayed phase 3T/8 or 4T/8 having the midpoint value can be selected as the phase of the receive clock.

Suppose here that the position (skew) where the data changes from data N−1 to data N is shorter in duration than the delayed phase spacing T/8, as depicted in FIG. 4, and that the position of this skew is located, for example, between the delayed phase 3T/8 and the delayed phase 4T/8.

If the position of the skew is located between the delayed phase 3T/8 and the delayed phase 4T/8, as depicted, the test parallel data may be received correctly, no matter which delayed clock, the delayed clock having the delayed phase 3T/8 or the delayed clock having the delayed phase 4T/8, is used.

However, if the delayed phase 3T/8 and the delayed phase 4T/8 is selected, data may be received at a timing that overlaps the setup time or hold time of FF0 to FF7, and this can result in an inability to receive the parallel data correctly.

Accordingly, selecting the delayed phase 3T/8 and the delayed phase 4T/8 as the phase of the receive clock means that the delayed phase that would normally be excluded has been selected.

Preferred embodiments of electronic apparatus disclosed in this specification will be described below with reference to the drawings. It will, however, be noted that the technical scope of the present invention is not limited by any particular embodiment described herein, and can be extended to the inventions described in the appended claims and their equivalents.

Figure 5:
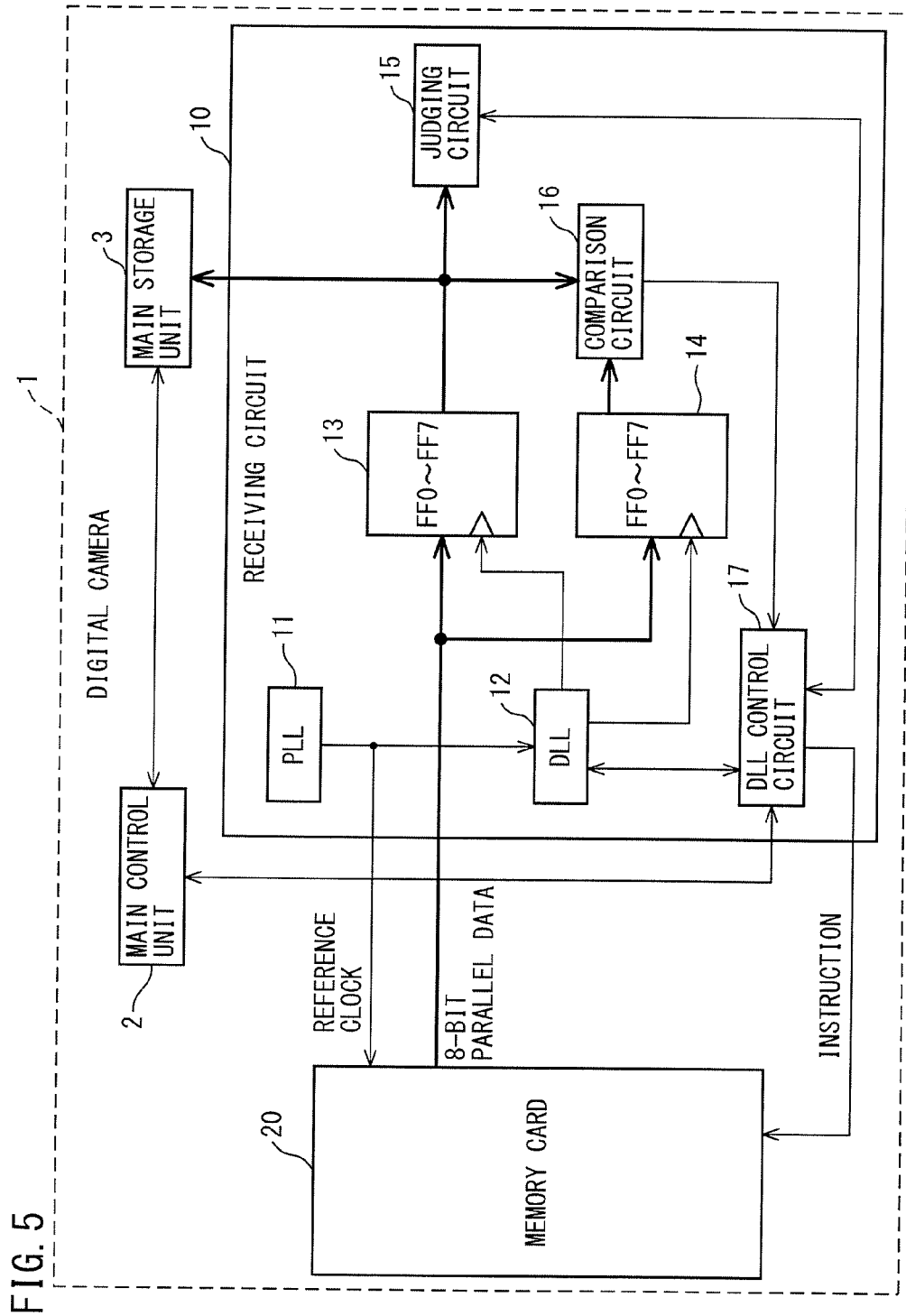
FIG. 5 is a diagram illustrating one embodiment of a digital camera disclosed in this specification.

FIG. 5 is a diagram illustrating one embodiment of a digital camera disclosed in this specification.

The digital camera 1 as an electronic apparatus according to the present embodiment includes a memory card 20 which stores image data and a receiving circuit 10 which receives parallel data output from the memory card 20. The digital camera 1 also includes a main control unit 2 which controls the receiving circuit 10 and a main storage unit 3 which stores the parallel data received by the receiving circuit 10. The digital camera 1 further includes an imaging unit not depicted and a transmitting circuit which transmits captured image data to the memory card 20.

The receiving circuit 10, under control of the main control unit 2, receives the image data output from the memory card 20 and supplies the received image data to the main storage unit 3.

When an instruction requesting transmission of image data is received from the receiving circuit 10, the memory card 20 transmits 8-bit parallel data as image data to the receiving circuit 10 via eight data lines D0 to D7 in synchronism with a reference clock supplied from the receiving circuit 10.

In order to receive the parallel data from the memory card 20 in synchronized fashion, the receiving circuit 10, using test parallel data, determines a receive clock that provides timing with which the data can be received, and receives the image data by using the thus determined receive clock.

The receiving circuit 10 has the configuration described below in order to determine the receive clock.

The receiving circuit 10 includes a PLL 11 as a phase-locked loop circuit which generates the reference clock, a DLL 12 as a delay-locked loop circuit which generates a delayed clock and an adjacent delayed clock, and a DLL control circuit 17 which controls the DLL 12. The DLL control circuit 17 is controlled by the main control unit 2.

The DLL 12 generates a two-phase clock delayed in phase with respect to the reference clock. More specifically, the DLL 12 outputs a delayed clock having a specific one of a plurality of delayed phases, one being the same as the phase of the reference clock and the others delayed with respect thereto, and an adjacent delayed clock having a delayed phase adjacent to the delayed phase of the delayed clock.

The DLL 12 can be configured to generate the two-phase delayed clock by using two delay elements selected from a set of delay elements and two selectors for selecting the respective delay elements.

The receiving circuit 10 further includes a first storage circuit 13 and a second storage circuit 14.

The first storage circuit 13 includes eight flip-flops (first flip-flops FF0 to FF7). Each of the first flip-flops FF0 to FF7 is connected to a corresponding one of the eight data lines D0 to D7 and, in synchronism with the delayed clock supplied from the DLL 12, receives and holds one-bit data out of the 8-bit parallel data transmitted from the memory card 20.

Similarly to the first storage circuit 13, the second storage circuit 14 includes eight flip-flops (second flip-flops FF0 to FF7). Each of the second flip-flops FF0 to FF7 is connected to a corresponding one of the eight data lines D0 to D7 and, in synchronism with the adjacent delayed clock supplied from the DLL 12, receives and holds one-bit data out of the 8-bit parallel data transmitted from the memory card 20.

The eight first flip-flops FF0 to FF7 correspond to the eight second flip-flops FF0 to FF7, respectively. The first flip-flop FF0 and the second flip-flop FF0 are both connected to the data line D0, and receive and hold the data transmitted via the data line D0. Similarly, the first flip-flops FF1 to FF7 and the second flip-flops FF1 to FF7 are connected to the data lines D2 to D7, respectively, and receive and hold the data transmitted via the respective data lines D2 to D7.

The receiving circuit 10 further includes a judging circuit 15 and a comparison circuit 16.

The judging circuit 15 judges whether the parallel data stored in the first storage circuit 13 has been received correctly or not, and supplies the result of the judgment to the DLL control circuit 17. More specifically, using a cyclic redundancy check scheme, the judging circuit 15 judges whether the parallel data received in synchronism with each specific delayed clock having a specific delayed phase has been received correctly or not.

The comparison circuit 16 performs a comparison as to whether the parallel data received in synchronism with one specific delayed clock and stored in the first storage circuit 13 matches the parallel data received in synchronism with an adjacent delayed clock having a delayed phase adjacent to the phase of the one specific delayed clock and stored in the second storage circuit 14, and supplies the result of the comparison to the DLL control circuit 17.

Based on the result of the judgment and the result of the comparison, the DLL control circuit 17 determines a phase range containing any delayed phase with which the parallel data has been received correctly and for which the result of the comparison indicates a match. Then, from the thus determined phase range, the DLL control circuit 17 determines the phase of the receive clock to be used for reception of the parallel data.

The DLL control circuit 17 may be implement in hardware or may be implemented by using an operational circuit that executes a program.

Figure 6:
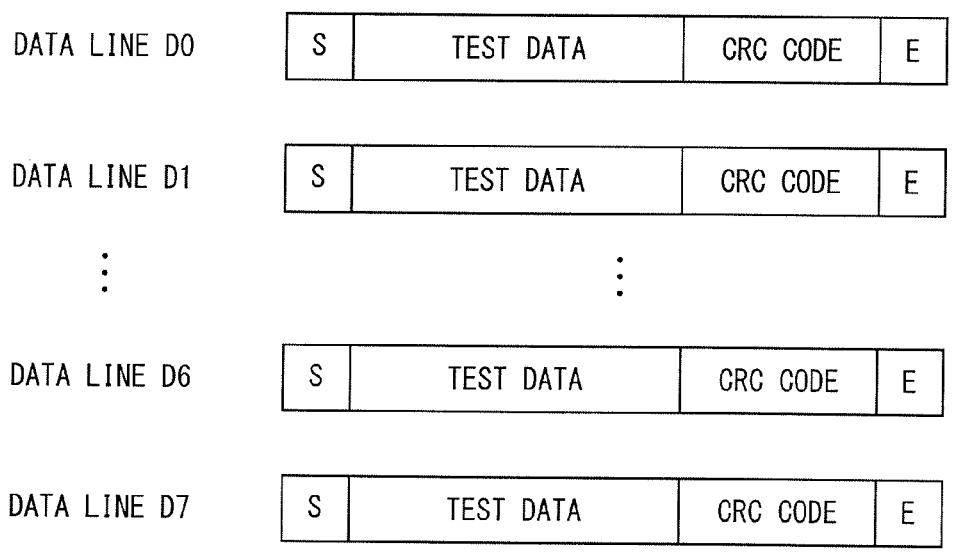
FIG. 6 is a diagram illustrating test parallel data.

FIG. 6 is a diagram illustrating the test parallel data.

The memory card 20 transmits the test parallel data to the receiving circuit 10 via the data lines D0 to D7. The data blocks transmitted on the respective data lines D0 to D7 each include a start bit S, test data, a CRC code as a cyclic redundancy check code, and an end bit E.

The test data is a bit sequence of 1s and 0s; preferably, all the bits are not 1s or 0s. The test data transmitted on adjacent data lines constitute bit pairs each consisting of a 1 and a 1, or a 0 and a 0, or a 1 and a 0. A CRC-16, for example, can be used as the CRC code. Preferably, the test parallel data is constructed so that the position where data changes between a 1 and a 0 is contained within one clock period of the reference clock.

Figure 7:
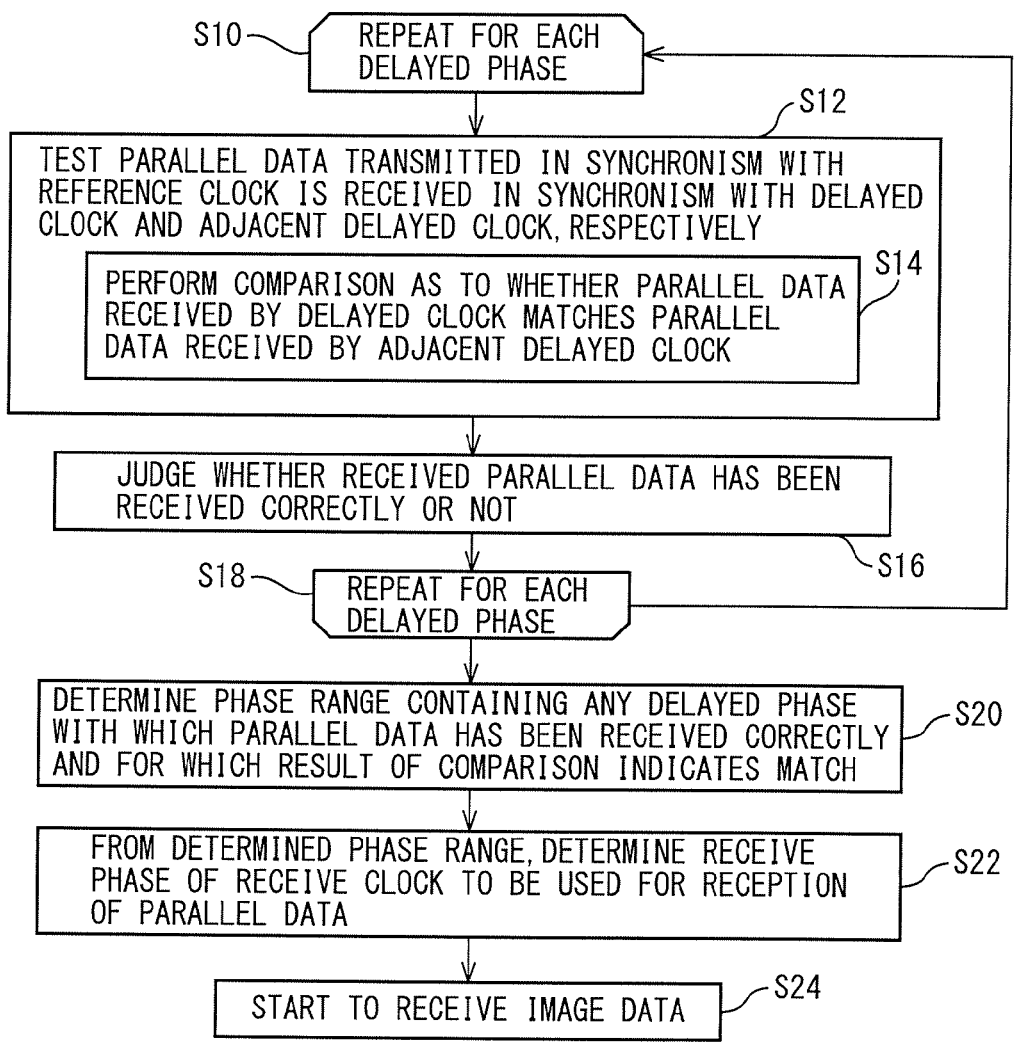
FIG. 7 is a flowchart illustrating the operation of a receiving circuit.

Next, the sequence of operations that the receiving circuit 10 in the digital camera 1 performs to determine the receive phase of the receive clock will be described below with reference to the flowchart of FIG. 7.

In the process between steps S10 and S18, the process from step S12 to step S16 is repeated for each of the delayed clocks having the respective delayed phases.

First, in step S12, the test parallel data that the memory card 20 outputs in synchronism with the reference clock is received by the receiving circuit 10 in synchronism with the delayed lock and its adjacent delayed clock, respectively.

The DLL control circuit 17, under control of the main control unit 2, instructs the DLL 11 to generate the delayed clock whose delayed phase is the same as the phase of the reference clock, and also instructs the memory card 20 to transmit out the test parallel data.

Figure 8:
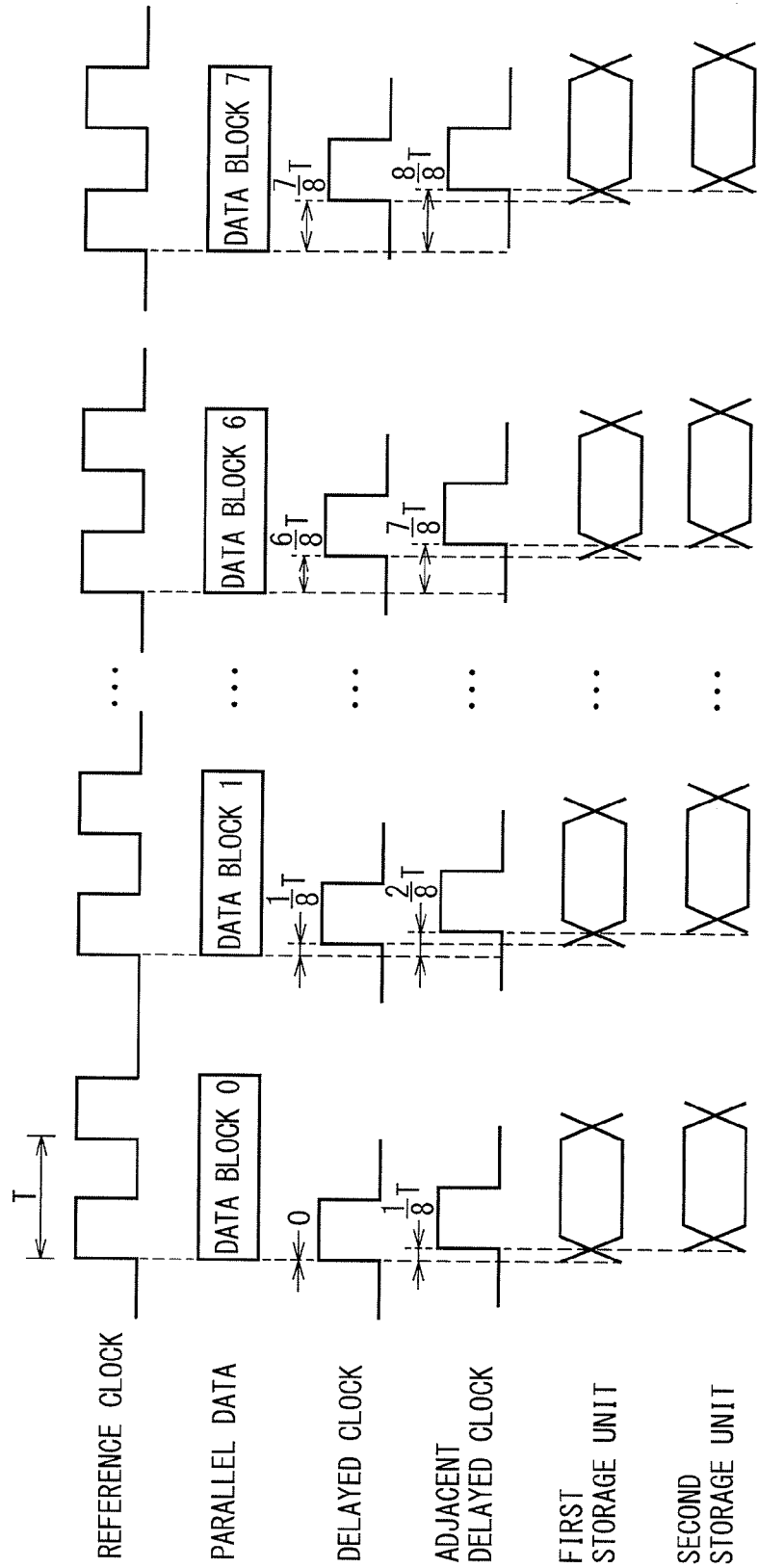
FIG. 8 is a timing chart illustrating how the test parallel data is received and stored in first and second storage units.

As illustrated in FIG. 8, when the instruction requesting transmission of the test parallel data is received from the DLL control circuit 17, the memory card 20 transmits the test parallel data to the receiving circuit 10 via the eight data lines D0 to D7 in synchronism with the rising edge of the reference clock. In FIG. 8, the test parallel data transmitted on the eight data lines D0 to D7 are depicted as data blocks 0 to 7, respectively. That is, the data blocks 0 to 7 are each transmitted to the receiving circuit 10 in synchronism with the rising edge of the reference clock.

Figure 9:
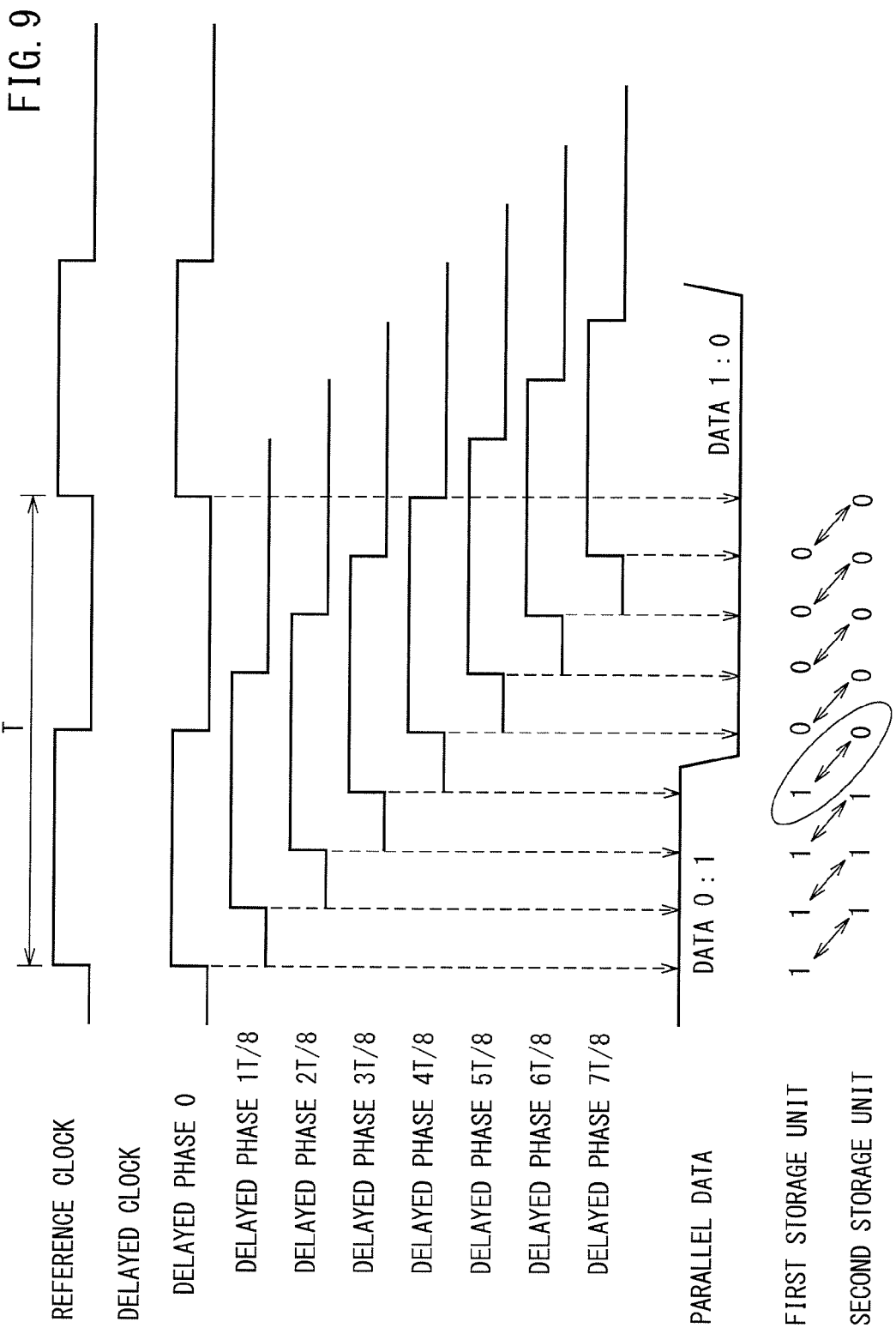
FIG. 9 is a diagram illustrating how the parallel data received by a delayed clock is compared with the parallel data received by an adjacent delayed clock.

As illustrated in FIG. 9, the DLL 12 generates eight delayed clocks having delayed phases delayed by 0 to 7T/8, respectively, with respect to the phase of the reference clock, and supplies the thus generated delayed clocks to the first storage circuit 13. The eight delayed clocks are shifted in phase by T/8 relative to each other. T is one clock period of the reference clock.

Further, the DLL 12 generates adjacent delayed clocks having delayed phases delayed by T/8 with respect to the delayed phases of the respective delayed clocks, and supplies the thus generated adjacent delayed clocks to the second storage circuit 14. The adjacent delayed clocks are delayed in phase by 1T/8 to 8T/8, respectively, with respect to the phase of the reference clock.

That is, when the delayed clock has a delayed phase whose phase difference is zero with respect to the reference clock, the adjacent delayed clock adjacent to this delayed clock is delayed in phase by 1T/8 with respect to the reference clock.

Similarly, when the delayed clock has a delayed phase whose phase difference is 1T/8 with respect to the reference clock, the adjacent delayed clock adjacent to this delayed clock is delayed in phase by 2T/8 with respect to the reference clock.

Further, when the delayed clock has a delayed phase whose phase difference is 7T/8 with respect to the reference clock, the adjacent delayed clock adjacent to this delayed clock is delayed in phase by 8T/8=(T) with respect to the reference clock. The other adjacent delayed clocks are also delayed in phase in like manner.

As illustrated in FIG. 8, in synchronism with the delayed clock supplied from the DLL 12, each of the first flip-flops FF0 to FF7 of the first storage circuit 13 receives and holds one-bit data transmitted via a corresponding one of the data lines D0 to D7. Then, as illustrated in FIG. 5, the first flip-flops FF0 to FF7 of the first storage circuit 13 output the thus held data to the judging circuit 15 and the comparison circuit 16.

Further, as illustrated in FIG. 8, in synchronism with the adjacent delayed clock supplied from the DLL 12, each of the second flip-flops FF0 to FF7 of the second storage circuit 14 receives and holds one-bit data transmitted via a corresponding one of the data lines D0 to D7. Then, as illustrated in FIG. 5, the second flip-flops FF0 to FF7 of the second storage circuit 14 output the thus held data to the comparison circuit 16.

Next, in step S14, the comparison circuit 16 performs a comparison to determine as to whether the parallel data received by the delayed clock matches the parallel data received by the adjacent delayed clock.

The data held in each of the first flip-flops FF0 to FF7 of the first storage circuit 13 is supplied to the comparison circuit 16. At the same time, the data held in each of the second flip-flops FF0 to FF7 of the second storage circuit 14 is supplied to the comparison circuit 16.

Then, the comparison circuit 16 performs a comparison as to whether the data held in each of the first flip-flops FF0 to FF7 of the first storage circuit 13 matches the data held in a corresponding one of the second flip-flops FF0 to FF7 of the second storage circuit 14, and supplies the result of the comparison to the DLL control circuit 17.

More specifically, the comparison circuit 16 compares the data held in the first flip-flop FF0 with the data held in the corresponding second flip-flop FF0. Likewise, the comparison circuit 16 compares the data held in the first flip-flops FF1 to FF7 with the data held in the corresponding second flip-flops FF1 to FF7. The comparison circuit 16 compares the other data in like manner.

In the example illustrated in FIG. 9, the memory card 20 transmits the test parallel data 0 and data 1 in sequence to the receiving circuit 10. The data 0 is transmitted before the data 1. It is assumed here that the data 0 is 8-bit parallel data of all 1s. It is also assumed that the data 1 is 8-bit parallel data of all 0s. Then, it is assumed that the position where the data 0 changes to the data 1 is located between the delayed phase 3T/8 and the delayed phase 4T/8.

The first flip-flops FF0 to FF7 of the first storage circuit 13, which receive data in synchronism with the delayed clock whose delayed phase is 0, receive the data 0. The second flip-flops FF0 to FF7 of the second storage circuit 14, which receive data in synchronism with the adjacent delayed clock adjacent to the delayed clock whose delayed phase is 0, also receive the data 0. Accordingly, the data held in each of the first flip-flops FF0 to FF7 of the first storage circuit 13 is a 1 (the data 0), and the data held in each of the second flip-flops FF0 to FF7 of the second storage circuit 14 is also a 1 (the data 0), i.e., both data match. Therefore, the comparison circuit 16 supplies the comparison result indicating that both data match to the DLL control circuit 17. The DLL control circuit 17 stores the comparison result.

The comparison circuit 16 compares the data held in the first flip-flop FF0 with the data held in the corresponding second flip-flip FF0 for all the test data transmitted from the memory card 20 and received by using the delayed clock whose delayed phase is 0.

The comparison circuit 16 compares the data held in the second storage circuit 14 with the data held in the first storage circuit 13, during the time interval starting from the moment the test data is held in the second storage circuit 14 and lasting until the moment the next test data is held in the first storage circuit 13. More specifically, the comparison circuit 16 may perform a comparison between the data held in the first flip-flop FF0 of the first storage circuit 13 and the data held in the second flip-flop FF0 of the second storage circuit 14, for example, by using the clock of delayed phase 0, i.e., the reference clock, during the time interval from the moment the request is made for the transmission of test data until the moment the reception of the test data is completed (the end bit is detected).

Next, in step S16, the judging circuit 15 judges whether the parallel data received by the first flip-flops FF0 to FF7 of the first storage circuit 13 has been received correctly or not. More specifically, the judging circuit 15 checks the test data transmitted via the data line D0 and received by the first flip-flip FF0 by using the CRC code received subsequent to the test data and judges whether the test data has been received correctly or not. In like manner, the judging circuit 15 judges whether the test data transmitted via each of the data lines D1 to D7 has been received correctly or not. Then, the judging circuit 15 supplies the result of the judgment to the DLL control circuit 17. The DLL control circuit 17 stores the result of the judgment.

If the CRC code cannot be correctly received, it is determined that the data has not been correctly received, even when the test data itself has been correctly received.

Next, the process proceeds to step S18 to repeat the process of steps S12 to S16 for each of the remaining delayed clocks having the delayed phases 1T/8 to 7T/8.

The process performed in step S14 will be described in further detail with reference to FIG. 9.

In step S14, the data received and held by the first flip-flops FF0 to FF7 of the first storage circuit 13 in synchronism with the delayed clocks having the delayed phases 1T/8 and 2T/8, respectively, are the same as the data received and held by the second flip-flops FF0 to FF7 of the second storage circuit 14 in synchronism with their respective adjacent delayed clocks.

Next, the first flip-flops FF0 to FF7 of the first storage circuit 13, which receive data in synchronism with the delayed clock having the delayed phase 3T/8, receive the data 0. On the other hand, the second flip-flops FF0 to FF7 of the second storage circuit 14, which receive data in synchronism with the delayed clock adjacent to the delayed clock having the delayed phase 3T/8, receive the data 1. Accordingly, the data held in each of the first flip-flops FF0 to FF7 of the first storage circuit 13 is a 1, while the data held in each of the second flip-flops FF0 to FF7 of the second storage circuit 14 is a 0, that is, both do not match. Therefore, the comparison circuit 16 supplies the comparison result indicating that both do not match to the DLL control circuit 17. The DLL control circuit 17 stores the comparison result.

Next, the first flip-flops FF0 to FF7 of the first storage circuit 13, which receive data in synchronism with the delayed clock having the delayed phase 4T/8, receive the data 1. The second flip-flops FF0 to FF7 of the second storage circuit 14, which receive data in synchronism with the delayed clock adjacent to the delayed clock having the delayed phase 4T/8, also receive the data 1. Accordingly, the data held in each of the first flip-flops FF0 to FF7 of the first storage circuit 13 is a 0, and the data held in each of the second flip-flops FF0 to FF7 of the second storage circuit 14 is also a 0, that is, both data match. Therefore, the comparison circuit 16 supplies the comparison result indicating that both data match to the DLL control circuit 17.

In like manner, the data received and held by the first flip-flops FF0 to FF7 of the first storage circuit 13 in synchronism with the delayed clocks having the delayed phases 5T/8 to 7T/8, respectively, are the same as the data received and held by the second flip-flops FF0 to FF7 of the second storage circuit 14 in synchronism with their respective adjacent delayed clocks.

In the example depicted in FIG. 9, it has been assumed that the data 0 is 8-bit parallel data of all 1s, and that the data 1 is 8-bit parallel data of all 0s. However, in actuality, there are cases where the 8-bit parallel data is not all 1s or all 0s. In any case, the comparison circuit 16 compares the data held in each of the first flip-flops FF0 to FF7 of the first storage circuit 13 with the data held in a corresponding one of the second flip-flops FF0 to FF7 of the second storage circuit 14. Then, when the comparison result is received that indicates that the data received via any one of the data lines D0 to D7 do not match between the first storage circuit 13 and the second storage circuit 14, the DLL control circuit 17 stores the result indicating that, for that particular delayed phase, the parallel data received by the delayed clock does not match the parallel data received by its adjacent delayed clock.

Next, in step S20, the DLL control circuit 17 determines the phase range containing any delayed phase with which the parallel data has been received correctly and for which the result of the comparison indicates a match.

Figure 10:
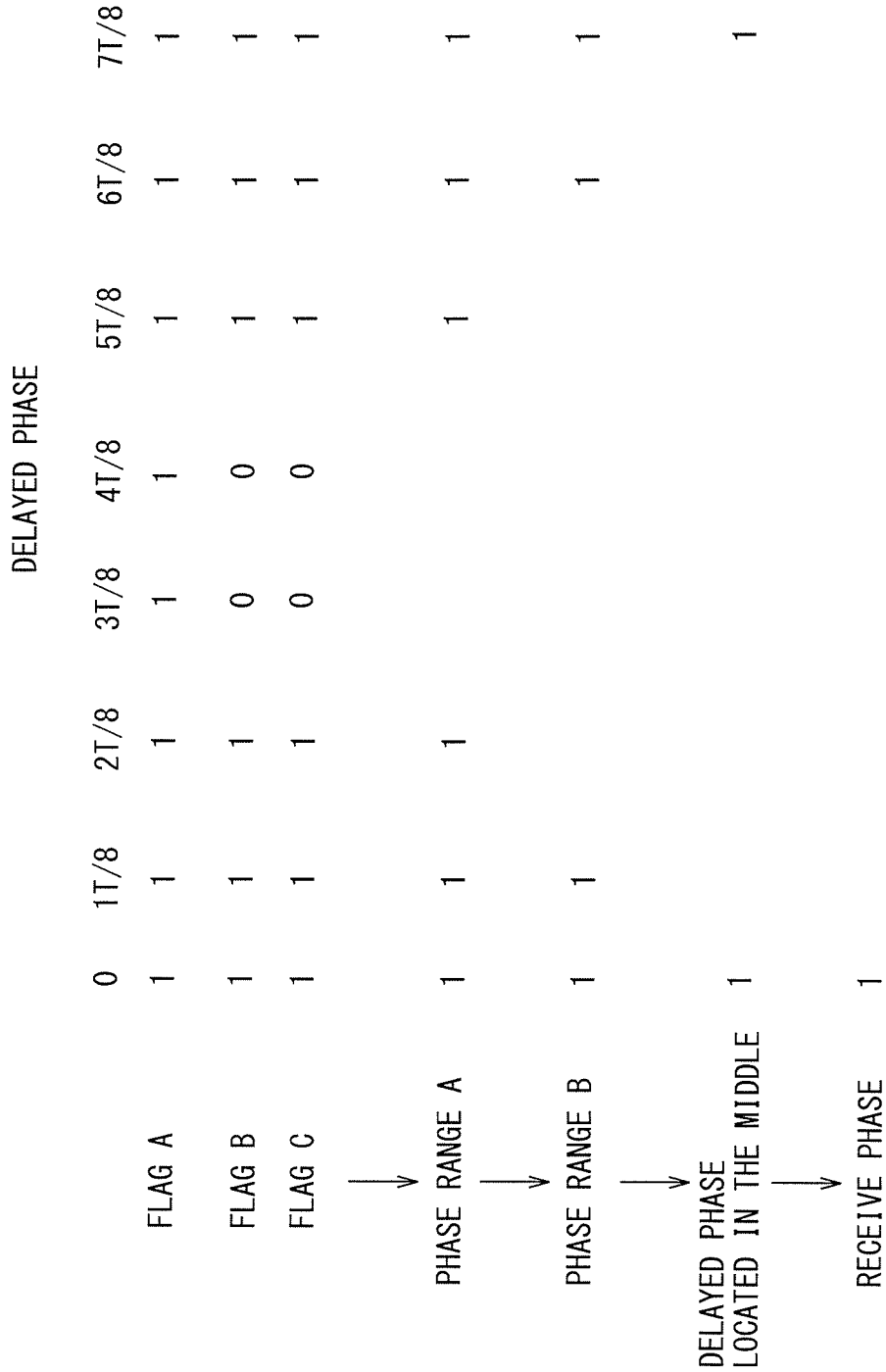
FIG. 10 is a diagram (part 1) illustrating how phase range and receive phase are determined.

More specifically, as depicted in FIG. 10, the DLL control circuit 17 sets a flag A for each delayed phase, depending on the result of the judgment.

That is, when all the test parallel data has been received correctly by using a specific delayed clock having a specific delayed phase, the DLL control circuit 17 sets the flag A to 1 for that specific delayed phase. Otherwise, the flag A is set to 0 for that delayed phase.

In the example depicted in FIG. 10, the flag A is set to 1 for all the delayed phases.

Further, as depicted in FIG. 10, the DLL control circuit 17 sets a flag B for each delayed phase, depending on the result of the comparison.

That is, when the test parallel data is received by using a specific delayed clock having a specific delayed phase, if the result of the comparison indicates a mismatch for any given bit data, the DLL control circuit 17 sets the flag B to 0 for that specific delayed phase. Otherwise, the flag B is set to 1 for that delayed phase.

As previously described with reference to FIG. 9, the data received and held by the first flip-flops FF0 to FF7 of the first storage circuit 13 in synchronism with the delayed clock having the delayed phase 3T/8 does not match the data received and held by the second flip-flops FF0 to FF7 of the second storage circuit 14 in synchronism with its adjacent delayed clock. Accordingly, in the example depicted in FIG. 10, the flag B is set to 0 for the delayed phase 3T/8.

Further, in the present embodiment, the flag B is also set to 0 for the delayed phase 4T/8 which is adjacent to the delayed phase for which the flag B has been set to 0.

Accordingly, in the example depicted in FIG. 10, the flag B is set to 0 for both the delayed phases 3T/8 and 4T/8.

Then, the DLL control circuit 17 computes a flag C for each delayed phase by ANDing the flag A with the flag B. Any delayed phase for which the flag C is set to 1 is a delayed phase with which the parallel data has been received correctly and for which the result of the comparison indicates a match.

Then, the DLL control circuit 17 determines a phase range A containing any delayed phase for which the flag C is set to 1. The phase range A contains the delayed phases 0, 1T/8, 2T/8, 5T/8, 6T/8, and 7T/8.

Next, in step S22, the DLL control circuit 17 determines from the thus determined phase range A the receive phase of the receive clock to be used for reception of the parallel data.

More specifically, a phase range B is defined by excluding the delayed phases located at the ends of the phase range A; then, the DLL control circuit 17 can determine from the thus defined phase range B the receive phase of the receive clock to be used for reception of the parallel data. The phase range B contains the delayed phases 0, 1T/8, 6T/8, and 7T/8. By excluding the delayed phases located at both ends of the phase range A, the data can be received by allowing a timing margin for the skew.

Further, the DLL control circuit 17 can determine the delayed phase 0 or 7T/8 located in the middle of the phase range A as the receive phase of the receive clock to be used for reception of the parallel data. By using the receive clock having a delayed phase located in the middle of the phase range A, the data can be received by allowing a greater timing margin for the skew.

In the present embodiment, of the delayed phases 0 and 7T/8 located in the middle of the phase range A, the delayed phase 0 having the smaller value is determined as the receive phase of the receive clock. The DLL control circuit 17 notifies the main control unit 2 that the receive phase of the receive clock has been determined. The main control unit 2 instructs the DLL control circuit 17 to receive the image data from the memory card 20. Further, the main control unit 2 instructs the main storage unit 3 to receive the image data from the receiving circuit 10.

Then, in step S24, the receiving circuit 10 starts to receive the image data by using the determined receive clock. The receiving circuit 10 transfers the received image data to the main storage unit 3 which thus stores the input image data.

Next, other examples of how the DLL control circuit 17 determines the phase range and the receive phase will be described below with reference to FIGS. 11 and 12.

Figure 11:
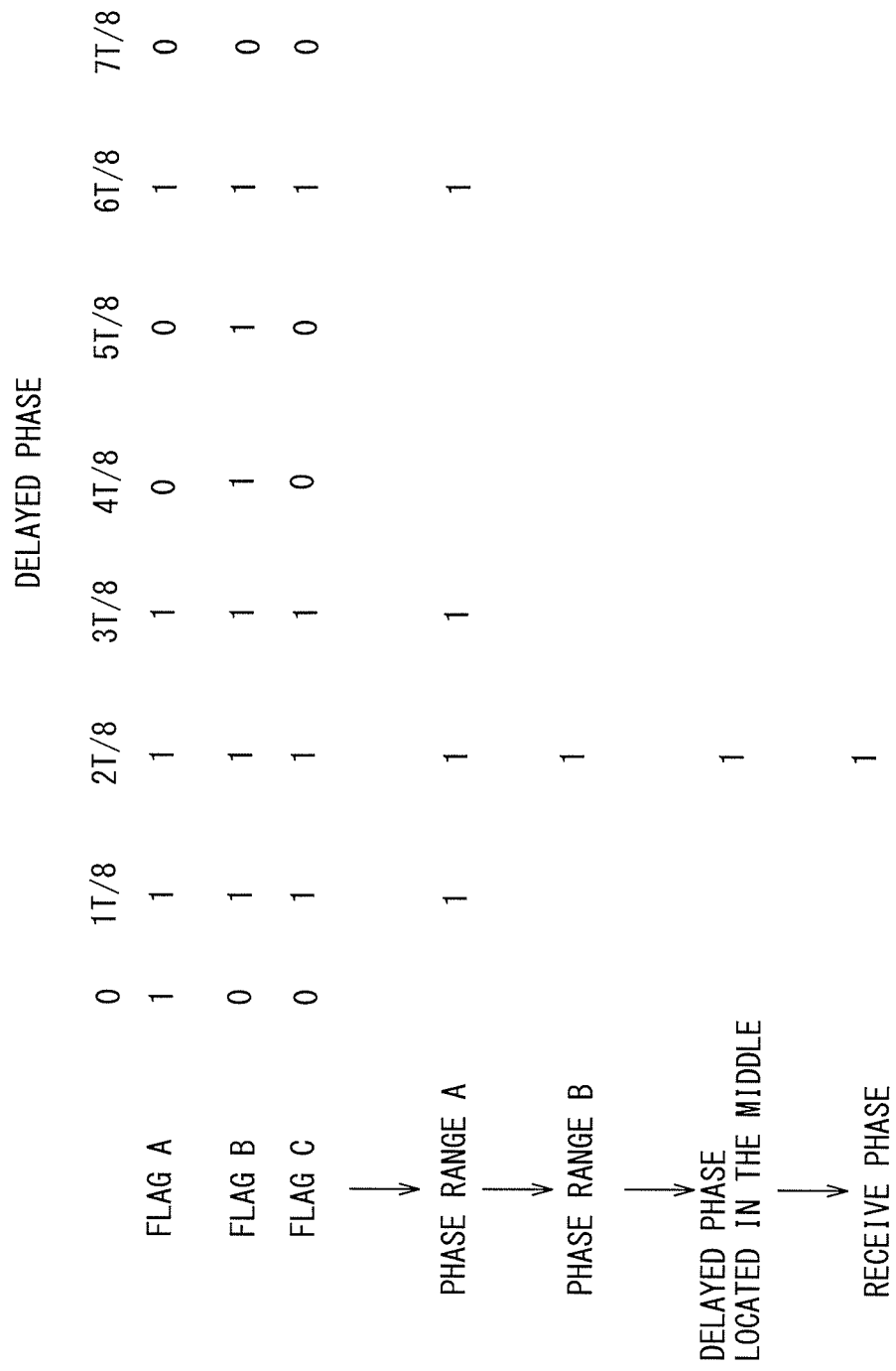
FIG. 11 is a diagram (part 2) illustrating how phase range and receive phase are determined.

In the example depicted in FIG. 11, the flag A is set to 1 for the delayed phases 0, 1T/8, 2T/8, 3T/8, 6T/8, and 7T/8. Further, in the example depicted in FIG. 11, the flag B is set to 0 for the delayed phases 0 and 7T/8.

Accordingly, the delayed phases for which the flag C is set to 1 are 1T/8, 2T/8, 3T/8, and 6T/8, and thus the phase range A contains the delayed phases 1T/8, 2T/8, 3T/8, and 6T/8.

In this case, the phase range B defined by excluding the delayed phases located at the ends of the phase range A contains 2T/8.

The delayed phase located in the middle of the phase range A is also 2T/8.

In the example depicted in FIG. 11, the delayed phase 2T/8 can be determined as the receive phase.

On the other hand, in the example depicted in FIG. 12, the flag A is set to 1 for the delayed phases 0, 1T/8, 2T/8, 3T/8, 4T/8, 5T/8, and 6T/8. Further, in the example depicted in FIG. 12, the flag B is set to 0 for the delayed phases 0 and 1T/8.

Accordingly, the delayed phases for which the flag C is set to 1 are 2T/8, 3T/8, 4T/8, 5T/8, and 6T/8, and thus the phase range A contains the delayed phases 2T/8, 3T/8, 4T/8, 5T/8, and 6T/8.

In this case, the phase range B defined by excluding the delayed phases located at the ends of the phase range A contains 3T/8, 4T/8, and 5T/8.

The delayed phase located in the middle of the phase range A is 4T/8.

In the example depicted in FIG. 12, the delayed phase 4T/8 can be determined as the receive phase.

According to the electronic apparatus of the present embodiment described above, since the receive phase of the receive clock to be used for reception of parallel data is determined from the phase range containing any delayed phase with which the parallel data has been received correctly and for which the result of the comparison indicates a match, the parallel data in which skew is present can be received correctly.

Another possible method for receiving the parallel data in which skew is present would be to reduce the interval between the delayed phases of the delayed clocks to be generated by the DLL. This may be accomplished by reducing the delayed phase interval, for example, from T/8 to T/16. However, reducing the delayed phase interval involves the problem that the circuit configuration of the receiving circuit containing the DLL becomes complex.

By contrast, according to the receiving circuit disclosed in the present embodiment, the parallel data in which skew is present can be received correctly without having to reduce the delayed phase spacing.

In the present invention, the method for determining the phase of the clock to be used for reception of parallel data, the receiving circuit, and the electronic apparatus according to the above embodiment can be modified in various ways without departing from the spirit and scope of the invention. Further, the constituent features of any one embodiment can be applied to other embodiments where appropriate.

For example, in the above embodiment, an adjacent clock having a delayed phase adjacent to and delayed with respect to the delayed phase of the delayed clock has been used as the adjacent delayed clock whose phase is adjacent to the delayed phase of the delayed clock. Alternatively, an adjacent clock having a delayed phase adjacent to and advanced with respect to the delayed phase of the delayed clock may be used as the adjacent delayed clock whose phase is adjacent to the delayed phase of the delayed clock.

Further, in the above embodiment, the judging circuit has been described as judging whether the parallel data received by each delayed clock having a different delayed phase has been received correctly or not by using a cyclic redundancy check scheme, but some other suitable check scheme may be used.

While the above embodiment has been described for the case where the receiving circuit is incorporated in a digital camera, the electronic apparatus incorporating the receiving circuit need not be limited to a digital camera.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that various changes, substitutions, and alterations could be made hereto without departing from the spirit and scope of the invention.

What is claimed is:

1. A method comprising:
for each of a plurality of delayed phases, one of the plurality of delayed phases being the same as a phase of a reference clock and the others of the plurality of delayed phases being delayed with respect to the phase of the reference clock, transmitting test parallel data in synchronism with the reference clock, and receiving the test parallel data in synchronism with a delayed clock having the delayed phase and an adjacent delayed clock having a delayed phase adjacent to the delayed phase of the delayed clock, respectively;
for each of the plurality of delayed phases, judging whether the parallel data received by the delayed clock has been received correctly or not, and performing a comparison as to whether the parallel data received by the delayed clock matches the parallel data received by the adjacent delayed clock;
determining a phase range containing, from among the plurality of delayed phases, a delayed phase with which the test parallel data has been received correctly and for which a result of the comparison indicates a match; and
determining, from the determined phase range, a phase of a receive clock to be used for reception of parallel data.

2. The method according to claim 1, wherein the phase of the receive clock to be used for reception of the parallel data is determined from a range defined by excluding any delayed phase located at an end of the phase range.

3. The method according to claim 1, wherein a delayed phase located in a middle of the phase range is determined as the phase of the receive clock to be used for reception of the parallel data.

4. The method according to claim 1, wherein the parallel data to be received by using the receive clock is transmitted in synchronism with a rising edge of the reference clock.

5. The method according to claim 1, wherein for each of the plurality of delayed phases, it is judged, by using a cyclic redundancy check scheme, whether the parallel data received by the delayed clock has been received correctly or not.

6. The method according to claim 1, wherein the test parallel data is constructed so that a position where data changes between a 1 and a 0 is located within one clock period of the reference clock.

7. A receiving circuit comprising:
a delay-locked loop circuit configured to output, for each of a plurality of delayed phases, one of the plurality of delayed phases being the same as a phase of a reference clock and the others of the plurality of delayed phases being delayed with respect to the phase of the reference clock, a delayed clock having the delayed phase and an adjacent delayed clock having a delayed phase adjacent to the delayed phase of the delayed clock, respectively;
a first storage circuit configured to receive and store, in synchronism with the delayed clock output from the delay-locked loop circuit, test parallel data that has been transmitted in synchronism with the reference clock;
a second storage circuit configured to receive and store, in synchronism with the adjacent delayed clock output from the delay-locked loop circuit, the parallel data that has been transmitted in synchronism with the reference clock;
a judging circuit configured to judge, for each of the plurality of delayed phases, whether the parallel data stored in the first storage unit has been received correctly or not, and to output a result of the judgment;
a comparison circuit configured to perform, for each of the plurality of delayed phases, a comparison as to whether the parallel data received in synchronism with the delayed clock and stored in the first storage unit matches the parallel data received in synchronism with the adjacent delayed clock and stored in the second storage unit, and to output a result of the comparison; and
a phase determining circuit configured to receive the result of the judgment and the result of the comparison, to determine a phase range containing, from among the plurality of delayed phases, a delayed phase with which the test parallel data has been received correctly and for which the result of the comparison indicates a match, and to determine, from the determined phase range, a phase of a receive clock to be used for reception of parallel data.

8. The receiving circuit according to claim 7, wherein the parallel data is n-bit data, and wherein
the first storage circuit includes a number, n, of first flip-flops, each of the first flip-flops receiving and holding one-bit data in synchronism with the delayed clock,
the second storage circuit includes a number, n, of second flip-flops, each of the second flip-flops receiving and holding one-bit data in synchronism with the adjacent delayed clock, and
the comparison unit is configured to compare the bit data stored in each of the first flip-flops of the first storage circuit with the bit data stored in a corresponding one of the second flip-flops of the second storage circuit.

9. The receiving circuit according to claim 7, wherein the phase determining circuit is configured to determine the phase of the receive clock to be used for reception of the parallel data, from a range defined by excluding any delayed phase located at an end of the phase range.

10. The receiving circuit according to claim 7, wherein the phase determining circuit is configured to determine a delayed phase located in a middle of the phase range as the phase of the receive clock to be used for reception of the parallel data.

11. An electronic apparatus incorporating a receiving circuit, the receiving circuit comprising:
a delay-locked loop circuit configured to output, for each of a plurality of delayed phases, one of the plurality of delayed phases being the same as a phase of a reference clock and the others of the plurality of delayed phases being delayed with respect to the phase of the reference clock, a delayed clock having the delayed phase and an adjacent delayed clock having a delayed phase adjacent to the delayed phase of the delayed clock, respectively;
a first storage circuit configured to receive and store, in synchronism with the delayed clock output from the delay-locked loop circuit, test parallel data that has been transmitted in synchronism with the reference clock;

a second storage circuit configured to receive and store, in synchronism with the adjacent delayed clock output from the delay-locked loop circuit, the parallel data that has been transmitted in synchronism with the reference clock;

a judging circuit configured to judge, for each of the plurality of delayed phases, whether the parallel data stored in the first storage unit has been received correctly or not, and to output a result of the judgment;

a comparison circuit configured to perform, for each of the plurality of delayed phases, a comparison as to whether the parallel data received in synchronism with the delayed clock and stored in the first storage unit matches the parallel data received in synchronism with the adjacent delayed clock and stored in the second storage unit, and to output a result of the comparison; and a phase determining circuit configured to receive the result of the judgment and the result of the comparison, and to determine a phase range containing, from among the plurality of delayed phases, a delayed phase with which the test parallel data has been received correctly and for which the result of the comparison indicates a match, and to determine, from the determined phase range, a phase of a receive clock to be used for reception of parallel data.

12. The electronic apparatus according to claim 11, wherein the parallel data is n-bit data, and wherein the first storage circuit includes a number, n, of first flip-flops, each of the first flip-flops receiving and holding one-bit data in synchronism with the delayed clock, the second storage circuit includes a number, n, of second flip-flops, each of the second flip-flops receiving and holding one-bit data in synchronism with the adjacent delayed clock, and the comparison unit is configured to compare the bit data stored in each of the first flip-flops of the first storage circuit with the bit data stored in a corresponding one of the second flip-flops of the second storage circuit.

13. The electronic apparatus according to claim 11, wherein the phase determining circuit is configured to determine the phase of the receive clock to be used for reception of the parallel data, from a range defined by excluding any delayed phase located at an end of the phase range.

14. The electronic apparatus according to claim 11, wherein the phase determining circuit is configured to determine a delayed phase located in a middle of the phase range as the phase of the receive clock to be used for reception of the parallel data.

* * * * *